United States Patent [19]

Kubo

[11] Patent Number: 4,690,425
[45] Date of Patent: Sep. 1, 1987

[54] SHOCK ABSORBER MOUNT ASSEMBLY FOR MOTOR VEHICLE SUSPENSION

[75] Inventor: Kanji Kubo, Kanagawa, Japan

[73] Assignee: Honda giken Kogyo Kabushiki Kaisha, Tokyo, Japan

[21] Appl. No.: 872,122

[22] Filed: Jun. 9, 1986

[30] Foreign Application Priority Data

Jun. 11, 1985 [JP] Japan .............................. 60-87724[U]

[51] Int. Cl.$^4$ ............................................. B60F 11/16
[52] U.S. Cl. .................................. 280/668; 267/195; 280/673; 280/696; 280/701; 280/724
[58] Field of Search ............... 280/688, 668, 673, 696, 280/701, 724; 267/8 R

[56] References Cited

U.S. PATENT DOCUMENTS

| | | | |
|---|---|---|---|
| 4,260,177 | 4/1981 | Pflughaupt et al. | 280/668 |
| 4,477,061 | 10/1984 | Kawaura et al. | 280/668 |
| 4,497,523 | 2/1985 | Lederman | 286/673 |

FOREIGN PATENT DOCUMENTS 2820585 11/1982 Fed. Rep. of Germany.

Primary Examiner—John J. Love
Assistant Examiner—Kenneth R. Rice
Attorney, Agent, or Firm—Bogucki, Scherlachr, Mok & Roth

[57] ABSTRACT

A shock absorber/coil assembly in a motor vehicle suspension includes a fluid cylinder, a piston rod movable into and out of the cylinder, a vibration isolator mounted on an end of the piston rod, and a coil spring disposed around the fluid cylinder and the piston rod. A mount assembly for mounting the shock absorber/coil assembly includes a retainer adapted to be mounted on the vibration isolator and to be attached to a motor vehicle frame, a spring seat adapted to engage an end of the coil spring, and a thrust bearing interposed between the retainer and the spring seat and adapted to extend around the vibration isolator, the thrust bearing including a pair of first and second races and a plurality of balls rotatably disposed between the first and second races, the first race engaging the retainer and the second race engaging the spring seat.

8 Claims, 2 Drawing Figures

SHOCK ABSORBER MOUNT ASSEMBLY FOR MOTOR VEHICLE SUSPENSION

BACKGROUND OF THE INVENTION

1. Field of the Invention

The present invention relates to a shock absorber mount assembly for use on the upper end of a shock absorber in a motor vehicle suspension.

2. Description of the Relevant Art

Shock absorbers in motor vehicle suspensions have an upper end coupled to a motor vehicle frame and a lower end to a member of the motor vehicle suspension. To attach the upper end of such a shock absorber to the motor vehicle frame, a vibration isolator is mounted on the upper end of the piston rod of the shock absorber, i.e., the shock absorber stud, and a retainer secured to the vibration isolator is fastened by bolts to the motor vehicle frame. Where a coil spring is disposed around the shock absorber, an upper spring seat engaging the upper end of the coil spring should be located as closely to the retainer as possible so as to employ a coil spring of an increased length, i.e., to provide a longer spring stroke while keeping the entire length of the shock absorber to a minimum.

West German Patent No. 2,820,585 discloses a shock absorber having an upper spring seat engaging the upper end of a coil spring and supported on a vibration isolator, the upper spring seat being positioned closely to a retainer on the distal end of the piston rod so that the coil spring used may be of an increased length. With this conventional structure, however, the vibration isolator should be of a large vibration isolating capability since the resilient forces from the coil spring act through the upper spring seat on the vibration isolator.

SUMMARY OF THE INVENTION

It is an object of the present invention to provide a shock absorber mount assembly for motor vehicle suspensions which allows a coil spring of an increased length and a vibration isolator of a reduced vibration isolating capability to be employed in combination with a shock absorber.

According to the present invention, there is provided a mount assembly for mounting a shock absorber/coil assembly in a motor vehicle suspension, the shock absorber/coil assembly including a fluid cylinder, a piston rod movable into and out of the cylinder, a vibration isolator mounted on an end of the piston rod, and a coil spring disposed around the fluid cylinder and the piston rod, the mount assembly comprising a retainer adapted to be mounted on the vibration isolator and to be attached to a motor vehicle frame, a spring seat adapted to engage an end of the coil spring, and a thrust bearing interposed between the retainer and the spring seat and adapted to extend around the vibration isolator, the thrust bearing including a pair of first and second races and a plurality of balls rotatably disposed between the first and second races, the first race engaging the retainer and the second race engaging the spring seat.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
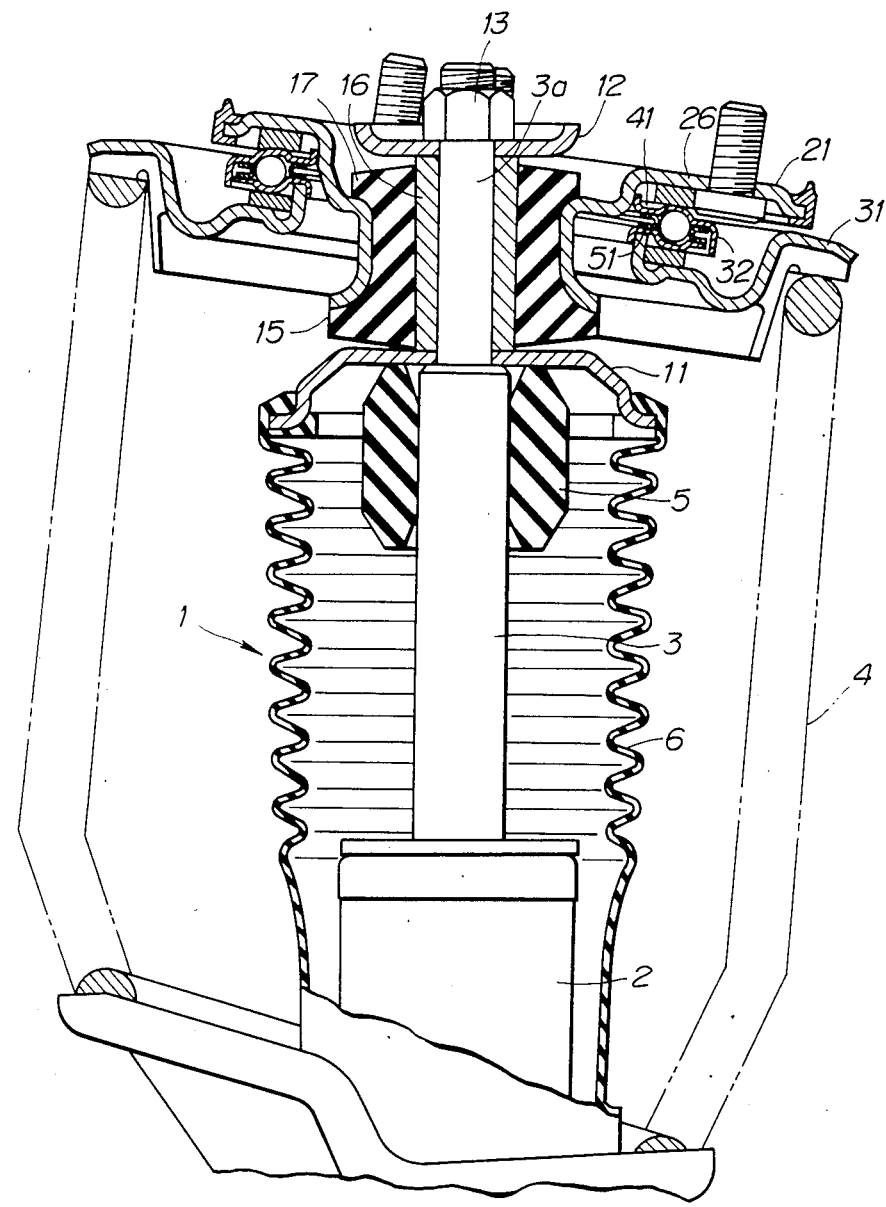
FIG. 1 is a cross-sectional view of a shock absorber mount assembly according to the present invention.

As shown in FIG. 1, a shock absorber/coil spring assembly for use in a motor vehicle suspension includes shock absorber 1 comprising a cylinder 2 having a lower end attached to a suspension member (not shown) and a piston rod 3 having one end secured to a piston (not shown) slidably disposed in the cylinder 2, the piston rod 3 being thus movable into and out of the cylinder 2. The assembly also includes a coil spring 4 disposed around the cylinder 2 and the piston rod 3. A bumper 5 is mounted on the upper end of the piston rod 3 for engagement with the upper end of the cylinder 2 when the piston rod 3 is forcibly moved into the cylinder 2. A smaller-diameter shock absorber stud 3a projects coaxially from the upper end of the piston rod 3. A rubber boot 6 is disposed in surrounding relation to the cylinder 2 and the piston rod 3 and has an upper end fixed to a boot support 11 attached to the shock absorber stud 3a near the upper end of the piston rod 3.

A vibration isolator 15 is mounted on the shock absorber stud 3a. The vibration isolator 15 includes an inner tube 16 fitted over the shock absorber stud 3a and axially clamped between the boot support 11 and a retainer washer 12 mounted on the shock absorber stud 3a by a nut 13 threaded over the distal end of the stud 3a. The vibration isolator 15 includes an an annular rubber bushing 17 joined, by curing, to the outer circumferential surface of the inner tube 16.

Figure 2:
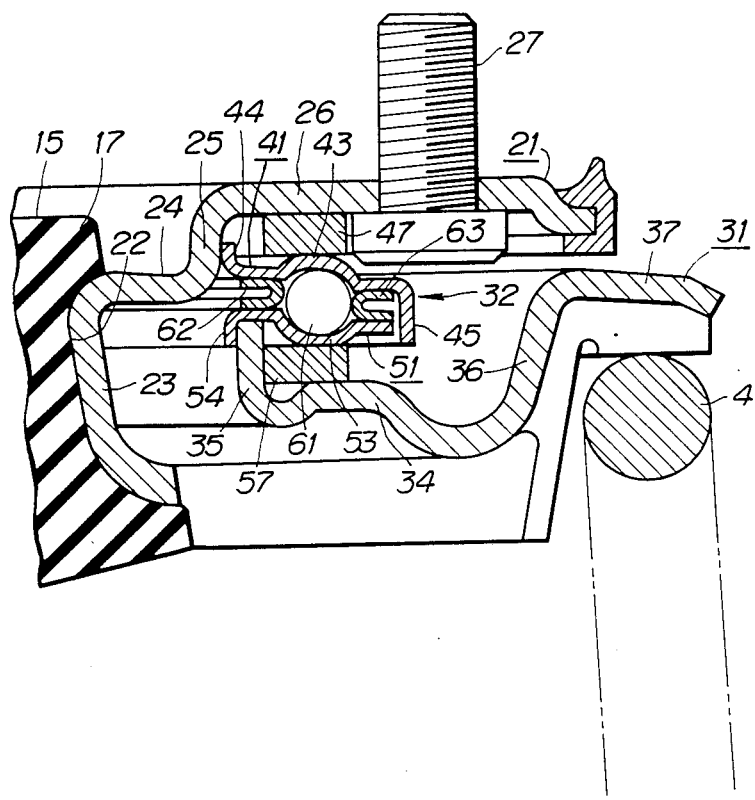
FIG. 2 is an enlarged fragmentary cross-sectional view of the shock absorber mount assembly shown in FIG. 1.

The upper end of the shock absorber 1 is secured to a motor vehicle frame by a retainer 21 attached to the ruber bushing 17. More specifically, as better shown in FIG. 2, the retainer 21 is of an annular unitary structure including a tubular base portion 23 joined, by curing, to the outer circumferential surface of an annular recess 22 defined in the rubber bushing 17, a flange 24 extending radially outwardly from the upper edge of the tubular base portion 23, a tubular shoulder 25 extending upwardly from the outer edge of the flange 24, and an attachment portion 26 extending radially outwardly from the upper edge of the tubular shoulder 25. The attachment portion 26 is fastened to the motor vehicle frame by means of bolts 27.

The upper end of the coil spring 4 engages an upper spring seat 31 disposed underneath the attachment portion 26 of the retainer 21. Between the attachment portion 26 and the upper spring seat 31, there is disposed a thrust bearing 32 of a relatively large diameter which extends around the flange 24 of the retainer 21 and hence the vibration isolator 15.

The upper spring seat 31 is of an annular unitary structure including a radial base portion 34, an axial tubular portion 35 extending upwardly from the inner edge of the base portion 34, a tapered tubular portion 36 extending upwardly and radially outwardly from the outer edge of the base portion 34, and a flange 37 extending radially outwardly from the upper edge of the tapered tubular portion 36. The upper end of the coil spring 4 is fitted over the tapered tubular portion 36 while in engagement with the flange 37.

The thrust bearing 32 comprises an upper race 41, a lower race 51 spaced downwardly from the upper race 41, a plurality of steel balls 61 rotatably disposed between the upper and lower races 41, 51, and annular seals 62, 63 disposed between the upper and lower races 41, 51 and radially inwardly and outwardly, respectively, of the balls 61.

The upper race 41 has an annular support 43 disposed over the balls 61 in covering relation thereto for resisting thrust, an inner flange 44 extending upwardly from the inner edge of the support 43 and fitted over the shoulder 25 of the retainer 21, and an outer flange 45 extending downwardly from the outer edge of the support 43 and covering the outer side of the seal 63. The thrust bearing 32 is prevented from being displaced radially by the inner flange 44 engaging the outer circumferential surface of the shoulder 25. An annular liner 47 is sandwiched between the attachment portion 26 and the support 43.

The lower race 51 has an annular support 53 disposed beneath the balls 61 in covering relation thereto for resisting thrust, and an inner flange 54 extending downwardly from the inner edge of the support 53. The tubular portion 35 of the upper spring seat 31 has an upper edge engaging the inner edge of the support 53 and fitted over the outer circumferential surface of the inner flange 54 for preventing the upper spring seat 31 from being moved radially. An annular liner 57 is fitted over the outer circumferential surface of the tubular portion 35 and sandwiched between the support 53 and the base portion 34

The thrust bearing 32 is positioned in the space beneath the attachment portion 26 of the retainer 21, and the upper spring seat 31 is disposed underneath the thrust bearing 32, with the tapered tubular portion 36 and the flange 37 being located closely to the retainer 21. Therefore, the coil spring 4 with its upper end engaging the flange 37 may be of an increased length and hence the stroke of the coil spring 4 may be increased. The resilient forces of the coil spring 4 are transmitted to the motor vehicle frame via the upper spring seat 31, the liner 57, the thrust bearing 32, the liner 47, and the retainer 21, but do not act directly on the vibration isolator 15. Therefore, the vibration isolator 15 may be of a reduced vibration isolating capability.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A mount assembly for mounting a shock absorber/coil assembly in a motor vehicle suspension, the shock absorber/coil assembly including a fluid cylinder, a piston rod movable into and out of the cylinder, a vibration isolator mounted on an end of the piston rod, and a coil spring disposed around the fluid cylinder and the piston rod, said mount assembly comprising:
   a retainer adapted to be mounted on said vibration isolator and having an attachment portion adapted for attachment to a motor vehicle frame;
   a spring seat adapted to engage an end of said coil spring; and
   a thrust bearing interposed between said attachment portion of said retainer and said spring seat and adapted to extend around said vibration isolator, said thrust bearing including a pair of first and second races and a plurality of balls rotatably disposed between said first and second races, said first race engaging said retainer and said second race engaging said spring seat.

2. A mount assembly according to claim 1, further including a pair of first and second liners, said first liner being sandwiched between said first race and said retainer, said second liner being sandwiched between said second race and said spring seat.

3. A mount assembly according to claim 1, wherein said spring seat is of an annular structure including a base portion, a first tubular portion extending substantially axially from an inner edge of said base portion and engaging said second race, a second tubular portion extending axially and radially outwardly from an outer edge of said base portion, and a flange extending radially outwardly from an outer edge of said second tubular portion and closely to said retainer.

4. A mount assembly according to claim 3, wherein said second race comprises an annular support covering said balls, and an inner flange extending substantially axially from an inner edge of said annular support, said first tubular portion having an edge engaging said annular support and fitted over an outer circumferential surface of said inner flange.

5. A mount assembly according to claim 4, further including a liner fitted over an outer circumferential surface of said first tubular portion and sandwiched between said attachment portion and said annular support.

6. A mount assembly for mounting a shock absorber/coil assembly in a motor vehicle suspension, the shock absorber/coil assembly including a fluid cylinder a piston rod movable into and out of the cylinder, a vibration isolator mounted on an end of the piston rod, and a coil spring disposed around the fluid cylinder and the piston rod, said mount assembly comprising:
   an annular retainer having a tubular base portion adapted to be fixed to said vibration isolator, a flange extending radially outwardly from an edge of said tubular base portion, a tubular shoulder extending substantially axially from an edge of said flange, and an attachment portion extending radially outwardly from an edge of said tubular shoulder and adapted to be secured to the motor vehicle frame;
   a spring seat adapted to engage an end of said coil spring; and
   a thrust bearing interposed between said attachment portion of said retainer and said spring seat and extending around said vibration isolator, said thrust bearing including a pair of first and second races and a plurality of balls rotatably disposed between said first and second races, said first race being fitted over said tubular shoulder and engaging said retainer and said second race engaging said spring seat.

7. A mount assembly according to claim 6, wherein said first race comprises an annular support covering said balls, an inner flange extending substantially axially from an inner edge of said annular support, and an outer flange extending substantially axially from an outer edge of said annular support, said inner flange engaging an outer circumferential surface of said tubular shoulder.

8. A mount assembly according to claim 7, further including a liner sandwiched between said attachment portion and said annular support.

* * * * *